United States Patent
Nusier et al.

(10) Patent No.: US 9,731,768 B2
(45) Date of Patent: Aug. 15, 2017

(54) VEHICLE STRUCTURAL REINFORCING DEVICE

(71) Applicant: Ford Global Technologies, LLC, Dearborn, MI (US)

(72) Inventors: Saied Nusier, Canton, MI (US); Mohamed Ridha Baccouche, Ann Arbor, MI (US); James Chih Cheng, Troy, MI (US); Jamel E. Belwafa, Ann Arbor, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 83 days.

(21) Appl. No.: 14/670,786

(22) Filed: Mar. 27, 2015

(65) Prior Publication Data

US 2016/0280274 A1 Sep. 29, 2016

(51) Int. Cl.
| | | |
|---|---|---|
| *B62D 21/15* | (2006.01) | |
| *B62D 21/03* | (2006.01) | |
| *B62D 25/20* | (2006.01) | |
| *B62D 25/04* | (2006.01) | |
| *B62D 25/06* | (2006.01) | |
| *B60K 1/04* | (2006.01) | |

(52) U.S. Cl.
CPC ........... *B62D 21/157* (2013.01); *B62D 21/03* (2013.01); *B62D 25/20* (2013.01); *B60K 2001/0422* (2013.01); *B62D 25/04* (2013.01); *B62D 25/06* (2013.01)

(58) Field of Classification Search
CPC .............................. B62D 21/157; B62D 21/03
USPC ................... 296/187.06, 187.08, 187.12
See application file for complete search history.

(56) References Cited

U.S. PATENT DOCUMENTS

| | | | | |
|---|---|---|---|---|
| 5,382,051 A | * | 1/1995 | Glance ................. | B60R 13/025 280/730.2 |
| 5,501,289 A | * | 3/1996 | Nishikawa .............. | B60K 1/04 180/65.1 |
| 5,755,484 A | | 5/1998 | Chou et al. | |
| 5,845,937 A | * | 12/1998 | Smith .................. | B62D 21/157 280/756 |
| 6,113,185 A | * | 9/2000 | Yamaguchi .......... | B60N 2/4221 280/748 |
| 6,237,991 B1 | * | 5/2001 | Weber .................. | B60N 2/4235 296/146.6 |
| 6,755,453 B2 | | 6/2004 | Kellas | |

(Continued)

FOREIGN PATENT DOCUMENTS

| | | | | | |
|---|---|---|---|---|---|
| CH | GB 2458680 A | * | 9/2009 | .......... | B60R 19/205 |
| DE | EP 1048551 A2 | * | 11/2000 | ............. | B62D 21/03 |

(Continued)

*Primary Examiner* — H Gutman
(74) *Attorney, Agent, or Firm* — Jason C. Rogers; Bejin Bieneman PLC

(57) ABSTRACT

A vehicle includes a chassis having a pair of rails spaced from each other and a deployable reinforcing device extending between the rails. The deployable reinforcing device includes a beam disposed between the pair of rails and including walls and hinges connected in alternating arrangement. The walls are rotatable about the hinges from a collapsed position to an expanded position. The device includes a deployment mechanism disposed between the walls. When a vehicle impact is sensed, the deployment mechanism is deployed to expand the beam to the expanded position to reinforce the rails.

11 Claims, 8 Drawing Sheets

(56) References Cited

U.S. PATENT DOCUMENTS

| | | | |
|---|---|---|---|
| 6,877,795 B2 | 4/2005 | Browne et al. | |
| 6,955,391 B1 | 10/2005 | Peng | |
| 7,140,478 B2 * | 11/2006 | Barvosa-Carter | B61G 11/12 188/267 |
| 7,264,271 B2 * | 9/2007 | Barvosa-Carter | B60R 21/04 280/742 |
| 7,909,388 B2 * | 3/2011 | Gavrilov | B60J 5/0458 296/187.12 |
| 8,215,674 B2 * | 7/2012 | Persson | B62D 21/15 280/784 |
| 8,708,401 B2 | 4/2014 | Lee et al. | |
| 2002/0175537 A1 * | 11/2002 | Cress | B60J 5/0429 296/187.12 |
| 2003/0075373 A1 * | 4/2003 | Sawa | B60R 21/36 180/271 |
| 2003/0214155 A1 * | 11/2003 | Kiehl | B62D 21/02 296/204 |
| 2005/0218696 A1 | 10/2005 | Aase et al. | |
| 2006/0125225 A1 * | 6/2006 | Kondou | B62D 21/15 280/781 |
| 2006/0208473 A1 | 9/2006 | Morris et al. | |
| 2006/0290121 A1 | 12/2006 | Thomas | |
| 2007/0007060 A1 * | 1/2007 | Ono | B60K 1/04 180/65.31 |
| 2008/0174148 A1 * | 7/2008 | Perotto | B60R 19/00 296/187.06 |
| 2010/0109378 A1 * | 5/2010 | Melz | B60J 5/0459 296/187.12 |
| 2014/0338997 A1 * | 11/2014 | Okada | B62D 25/20 180/68.5 |
| 2015/0352813 A1 * | 12/2015 | Galloway | B32B 15/08 602/13 |
| 2016/0051426 A1 * | 2/2016 | Hall | A61G 5/14 254/93 HP |

FOREIGN PATENT DOCUMENTS

| | | | | |
|---|---|---|---|---|
| DE | 10022094 A1 | * | 12/2001 | ............ B60R 21/36 |
| DE | 10331862 A1 | * | 2/2005 | ............ B60R 19/34 |
| DE | WO 2009065501 A1 | * | 5/2009 | ......... B62D 21/157 |
| FR | 2885584 A1 | * | 11/2006 | ........ B60R 21/0428 |
| WO | WO 2007062110 | | 5/2007 | |

* cited by examiner

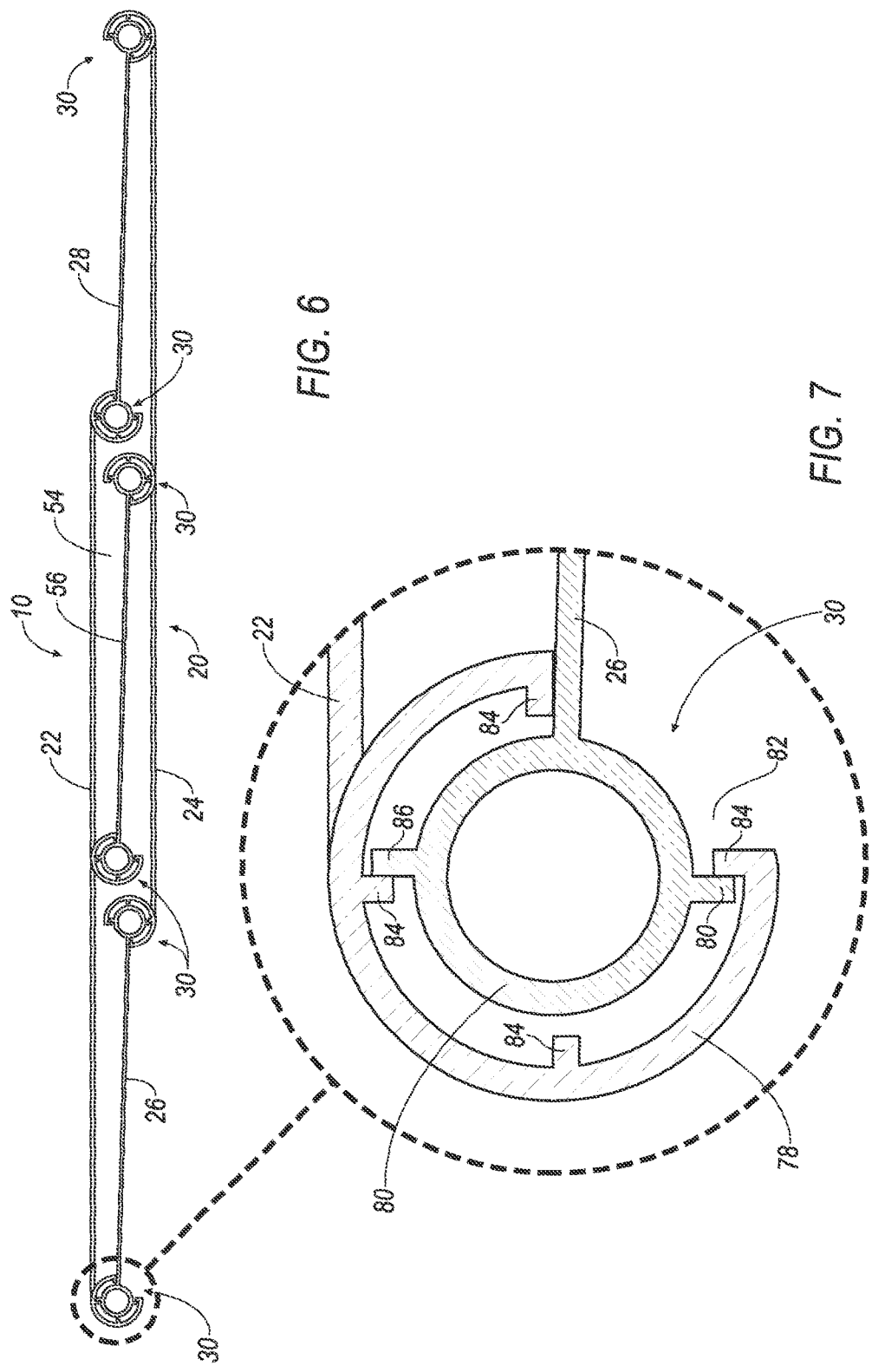

VEHICLE STRUCTURAL REINFORCING DEVICE

BACKGROUND

Vehicles, such as automobiles, include a frame and a body supported on the frame. The frame may be designed to provide structural rigidity to prevent unwanted deformation and/or to prevent intrusion during an impact. For example, an electric vehicle includes a battery and the frame may be designed to reinforce a compartment in which the battery is supported. The frame may, for example, include a pair of rails spaced from each other and extending in a fore and aft direction to define the battery compartment between the rails. The battery may extend from one of the rails to another of the rails.

Structural rigidity of the rails may be important to limit the possibility of deformation in the vicinity of the battery and/or to prevent intrusion into the battery compartment. However, structure added to the frame, e.g., added to the rails, may disadvantageously create packaging constraints that do not accommodate the battery between the rails. Such added structure may also occupy space otherwise occupied by the cabin of the vehicle, thus disadvantageously decreasing the size of the cabin.

There remains an opportunity to provide reinforcement between the rails while minimizing packaging constraints in the battery compartment and in the cabin of the vehicle.

BRIEF DESCRIPTION OF THE DRAWINGS

FIG. 6 is a cross-sectional view of the deployable reinforcing device in the collapsed position.

FIG. 7 is a magnified portion of a hinge shown in FIG. 6.

DETAILED DESCRIPTION

Figure 1:
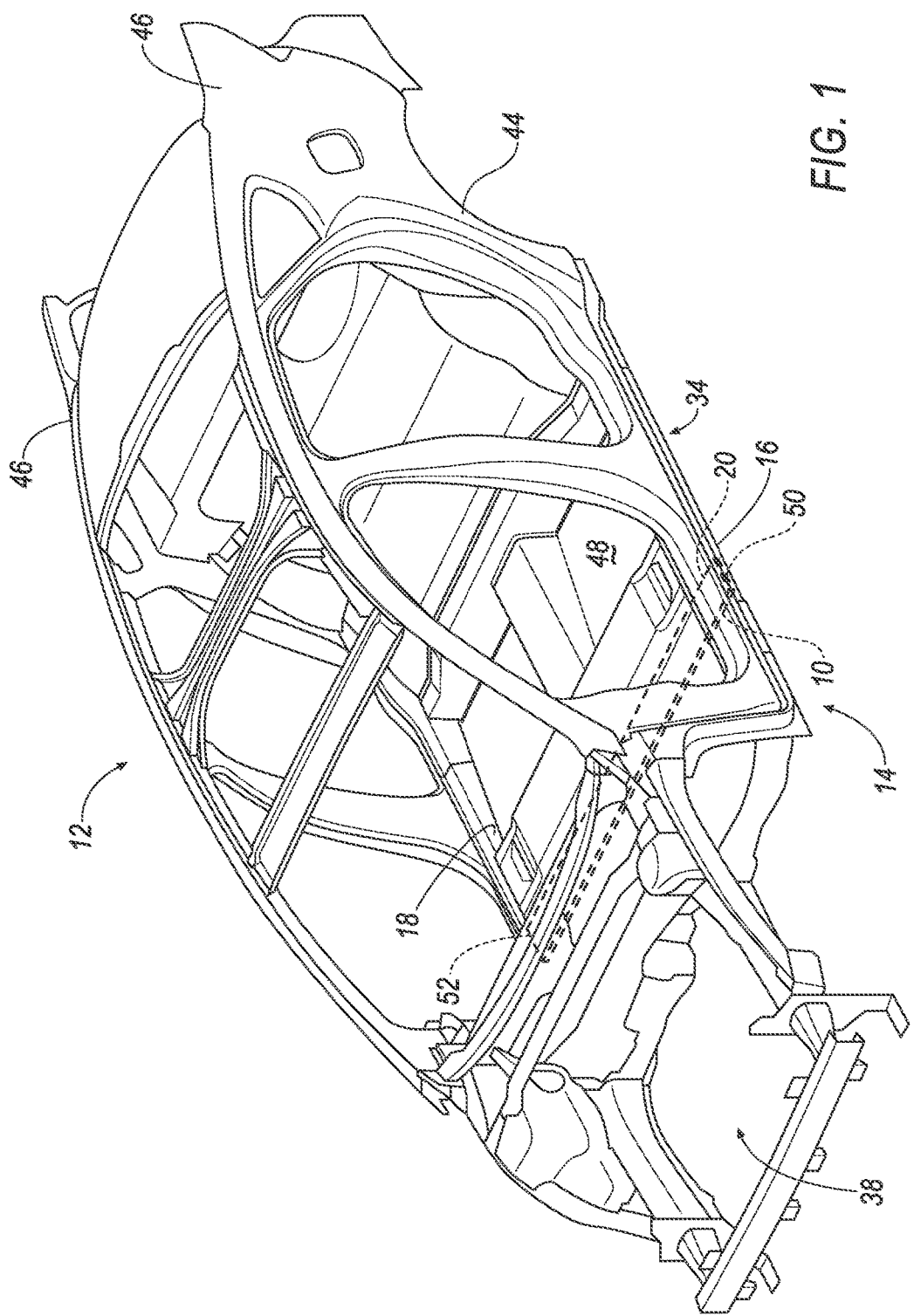
FIG. 1 is a perspective view of a portion of a vehicle including a body, a frame including two rails, and a deployable reinforcing device extending between the rails.

With reference to the Figures, wherein like numerals indicate like parts throughout the several views, a deployable reinforcing device 10 for a vehicle 12 is generally shown. A chassis 14 of the vehicle 12 includes a pair of rails 16, 18 spaced from each other. The device 10 includes a beam 20 disposed between the pair of rails 16, 18. The beam 20 includes walls 22, 24, 26, 28 and hinges 30 connected in alternating arrangement. Each hinge 30 is connected to two of the walls 22, 24, 26, 28. The walls 22, 24, 26, 28 are rotatable about the hinges 30 from a collapsed position to an expanded position. The device 10 includes a deployment mechanism 32 disposed between the walls 22, 24, 26, 28.

Figure 5A:
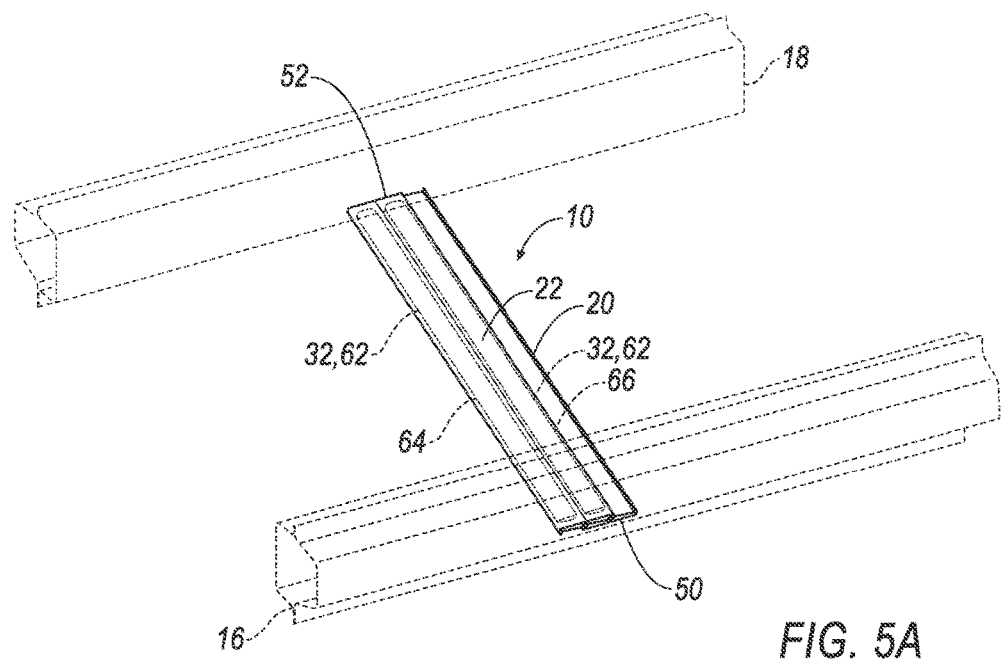
FIG. 5A is a perspective view of the deployable reinforcing device between the rails, shown in broken lines for illustrative purposes, with the deployable reinforcing device in a collapsed position.
Figure 5B:
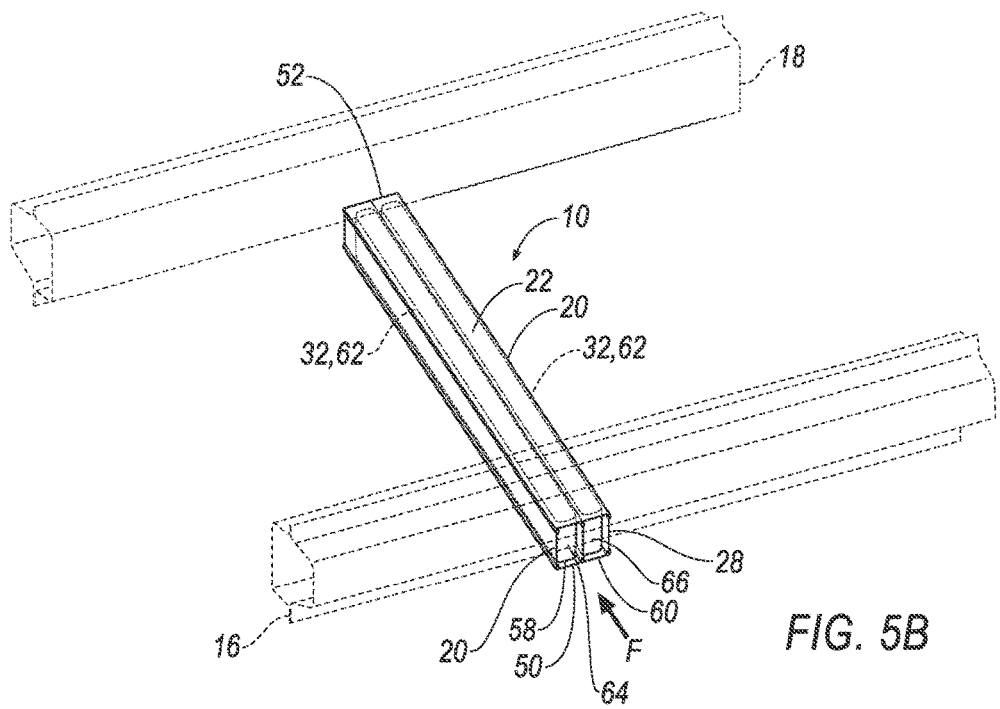
FIG. 5B is a perspective view of one of the deployable reinforcing device in an expanded position.

With reference to FIGS. 5A-B, during a vehicle 12 impact, the deployment mechanism 32 may be deployed between the walls to rotate the walls about the hinges 30. In other words, the deployment mechanism 32 forces the beam 20 from a collapsed position, as shown in FIG. 5A, to an expanded position, as shown in FIG. 5B. In the expanded position, the beam 20 provides structural rigidity, as discussed further below. In the collapsed position, the walls 22, 24, 26, 28 and hinges 30 are collapsed relative to each other to reduce the size of the beam 20.

Figure 2:
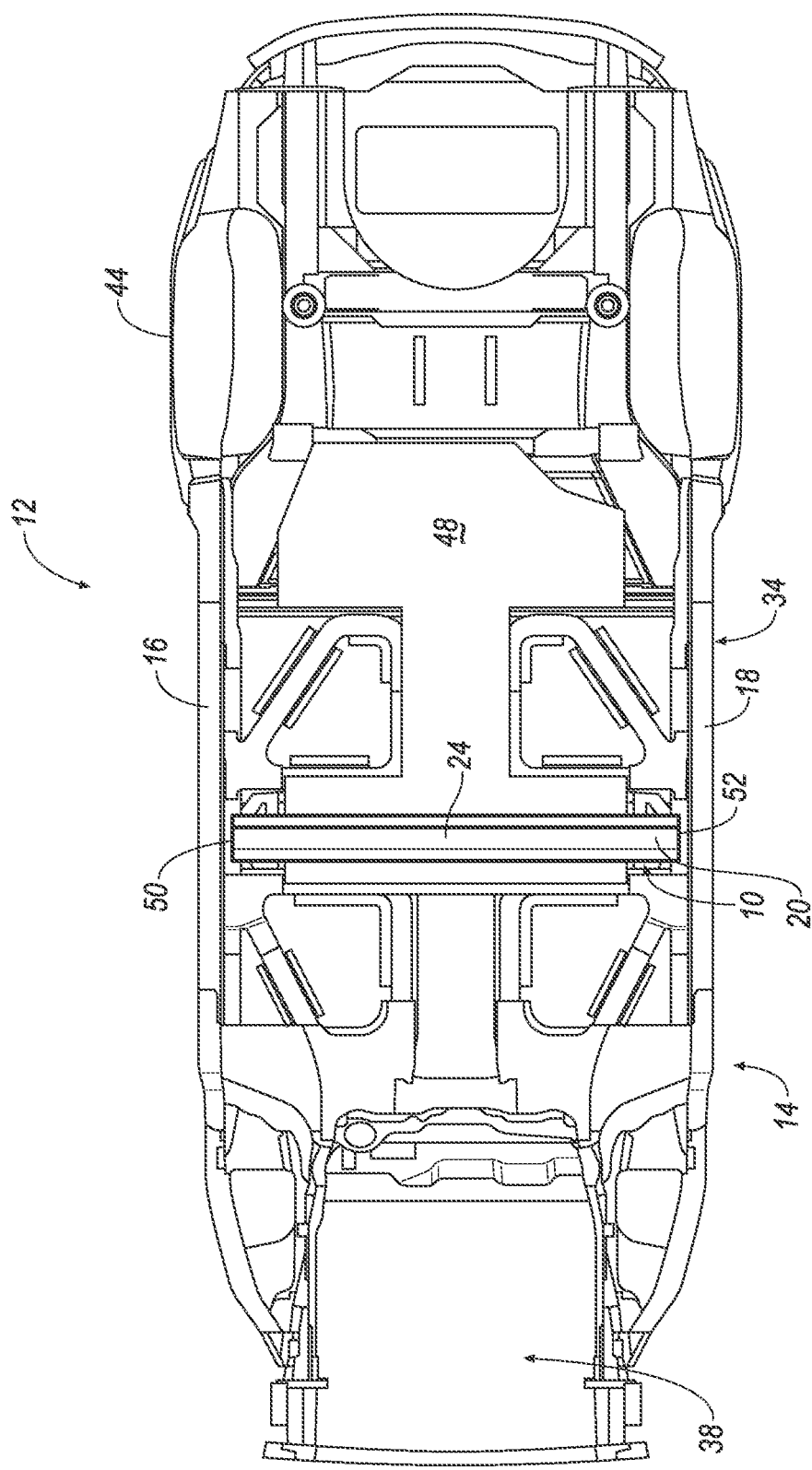
FIG. 2 is a bottom view of a portion of the vehicle.
Figure 3:
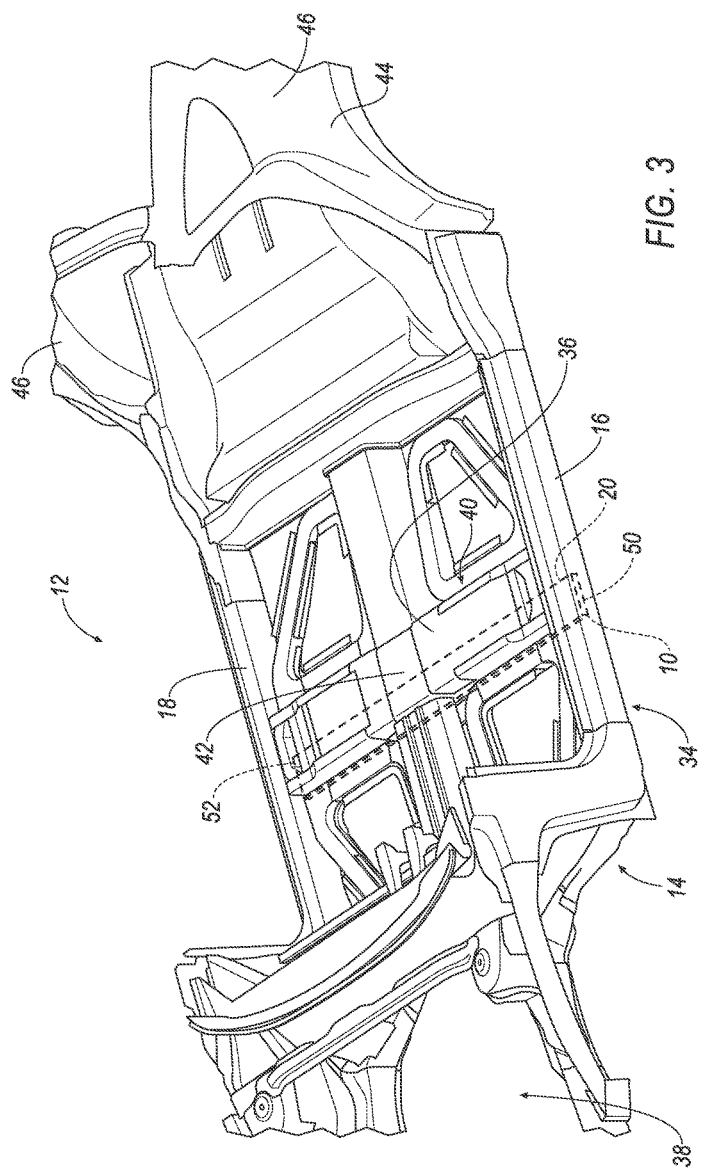
FIG. 3 is a perspective view of a portion of the vehicle with the floor removed for illustrative purposes showing a battery disposed above the deployable reinforcing device.

With reference to FIGS. 1-3, the vehicle 12 includes a chassis 14 including a frame 34 and a battery 36 (shown in FIG. 3). As set forth above, the frame 34 includes rails 16, 18. Specifically, the frame 34 includes a first rail 16 and a second rail 18, spaced from each other and each extending in a fore and aft direction. The rails 16, 18 may extend generally in parallel with each other. In addition to the rails 16, 18, the frame 34 may include cross-members (not shown) extending between the rails 16, 18, an engine compartment 38, etc.

As set forth further below, the device 10 extends from the first rail 16 to the second rail 18. The device 10 may be supported by the first rail 16 and the second rail 18, e.g., the device 10 may be directly connected to the first rail 16 and the second rail 18, as set forth further below. In the expanded position, the device 10 reinforces the frame 34 of the vehicle 12, e.g., rigidly extends between the first rail 16 and the second rail 18 to reinforce the first rail 16 and the second rail 18. The device 10 may alternatively be disposed in any suitable location of the vehicle 12. For example, the device 10 may be disposed along pillars of the vehicle 12 such as the A-pillar, B-pillar, C-pillar, etc. In such a configuration, the device 10 may be deployed to the expanded position during an impact, such as a vehicle 12 rollover, to resist roof crush. As another example, the device 10 may be disposed along a roof bow and/or roof headers to reinforce a roof of the vehicle 12 when the device 10 is deployed to the expanded position to resist roof crush and/or crush resulting from side impact.

Figure 4:
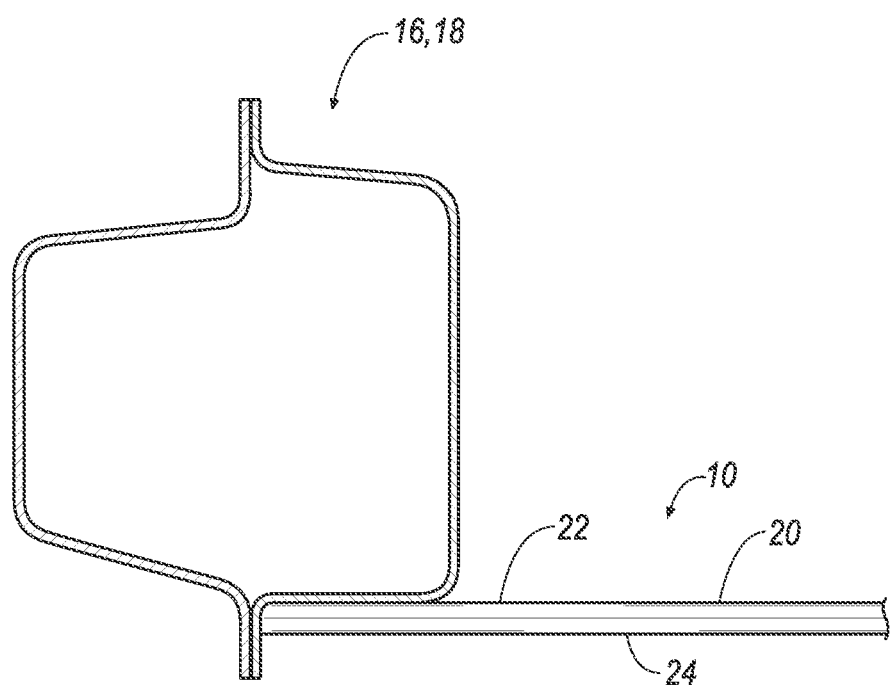
FIG. 4 is a cross sectional view of one of the rails and a portion of the deployable reinforcing device.

With reference to FIGS. 4-5B, the rails 16, 18 may have a generally rectangular cross-section. The rails 16, 18 may include two halves fixed together, e.g., by welding, as shown in FIG. 4, or alternatively may be a one piece unit or may include any suitable number of pieces. The rails 16, 18 may be formed from metal, such as steel or aluminum.

With reference to FIG. 3, the rails 16, 18 may define a battery 36 compartment between the rails 16, 18 and the battery 36 may be supported in the battery compartment 40. The battery 36 may be supported on the rails 16, 18, e.g., may include a box 42 (shown in FIG. 3) connected to one or both of the rails 16, 18. The battery 36 may extend from one of the rails 16, 18 to the other of the rails 16, 18. For example, the box 42 of the battery 36 may extend from one of the rails 16, 18 to the other of the rails 16, 18, as shown in FIG. 3.

With reference again to FIGS. 1-3, the vehicle 12 includes a body 44 supported on the frame 34. The body 44 may be supported on the frame 34 in any suitable fashion, e.g., welding. At least a portion of the body 44 may be supported on the rails 16, 18 of the frame 34. The frame 34 and body 44 may have a body-on-frame construction, a unibody construction, or any other suitable construction.

The body 44 may include a plurality of panels. The panels may include side panels 46, a floor 48, etc. The panels, e.g., the floor 48, may be fixed to the rails 16, 18 of the frame 34. The body 44 may be formed of any suitable material such as steel, aluminum, etc. For example, the body 44 may be formed from sheets of suitable material, e.g., sheet metal.

The floor 48 may extend from one of the rails 16, 18 to the other of the rails 16, 18 beneath the battery 36. The battery 36, e.g., the box 42 of the battery 36, may be supported on and/or fixed to the floor 48 and/or rails 16, 18.

Figure 8:
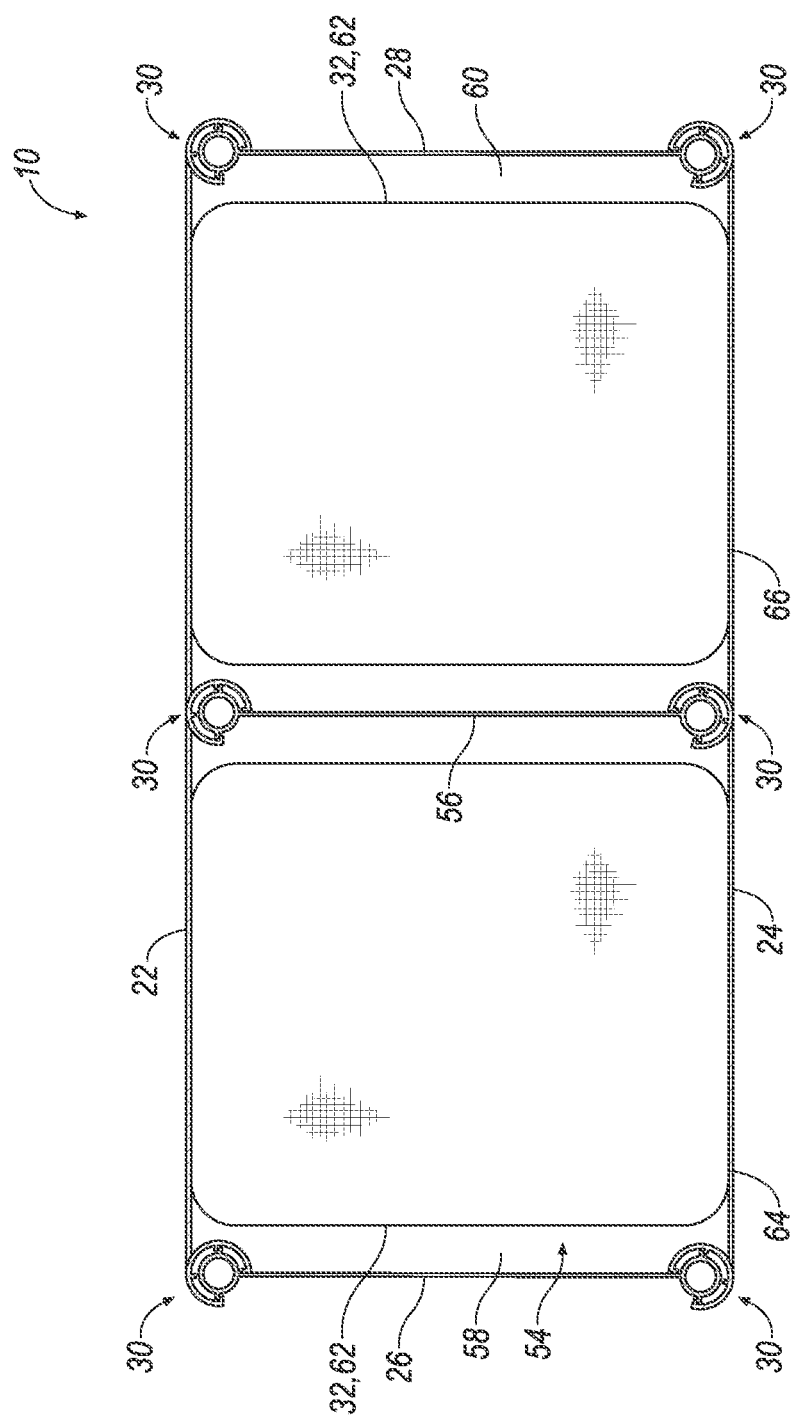
FIG. 8 is a cross-sectional view of the deployable reinforcing device in the expanded position.

With reference to FIGS. 6 and 8, the beam 20 may extend from a first end 50 to a second end 52 and may define a cavity 54 extending from the first end 50 to the second end 52. The beam 20 may extend from the first rail 16 to the second rail 18. The beam 20 may be connected to the pair of rails. For example, the first end 50 of the beam 20 may be connected to the first rail 16 and the second end 52 of the beam 20 may be connected to the second rail 18. The beam 20 may be fixed to the rails in any suitable fashion, e.g., welding, bonding, fastening, etc.

The beam 20 may be rectangular in cross-section. In such a configuration, the beam 20 includes a top wall 22, a bottom wall 24 spaced from the top wall 22, and two side walls 26, 28 spaced from each other and extending from the top wall 22 to the bottom wall 24. The cavity 54 is defined between the top wall 22, the bottom wall 24, and the side walls. As set forth above, the walls and hinges 30 are connected in alternating arrangement about the cavity 54. In other words, a hinge 30 is disposed between adjacent walls 22, 24, 26, 28, i.e., a hinge 30 is disposed between the top wall 22 and each side wall, respectively, and a hinge 30 is disposed between the bottom wall 24 and each side wall, respectively.

The beam 20 may include a fifth wall 56, i.e., a dividing wall, extending from the top wall 22 to the bottom wall 24 and dividing the cavity 54 into a first portion 58 and a second portion 60. A hinge 30 is disposed between the dividing wall 56 and the top wall 22, and a hinge 30 is disposed between the dividing wall 56 and the bottom wall 24. The dividing wall 56 may add rigidity to the beam 20 when the beam 20 is in the expanded position. In the alternative to the rectangular shape shown in the Figures, the beam 20 may have any suitable shape.

As shown in FIGS. 5A-B, the top wall 22 of the beam 20 may be supported on the rails 16, 18, and the side walls 26, 28 and the bottom wall 24 may be supported by the top wall 22, i.e., the side walls 26, 28 and the bottom wall 24 may hang downwardly from the top wall 22. The top wall 22 of the beam 20 may remain fixed to the rail 16, 18 as the device 10 is deployed to the expanded position.

The beam 20 may, for example, be formed of metal, such as aluminum. As another example, the beam 20 may be formed of carbon fiber reinforced polymer (CFRP). Alternatively, the beam 20 may be formed of steel, plastic, or any other suitable material.

The battery 36 may be disposed above the beam 20. As set forth further below, the beam 20 may increase the structural rigidity of the frame 34 of the vehicle 12 when the beam 20 is in the expanded position to reduce the likelihood of intrusion into the battery 36 compartment.

With reference to FIGS. 5A-B, the deployment mechanism 32 is disposed between the walls 22, 24, 26, 28. Specifically, the deployment mechanism 32 is disposed in the cavity 54. The deployment mechanism 32 is configured to be activated to deploy the device 10 from the collapsed position to the expanded position in response to a sensed impact.

The deployment mechanism 32 may be, for example, an inflatable device 62. The inflatable device 62 may also be referred to as an airbag assembly, and may be inflatable from an uninflated position, as shown in FIG. 5A, to an inflated position, as shown in FIG. 5B, to move the beam 20 from the collapsed position to the expanded position.

The inflatable device 62 may be disposed in the cavity 54. The inflatable device 62 may include an airbag 64, 66 disposed in the cavity 54. For example, the inflatable device 62 may include a first airbag 64 disposed in the first portion 58 of the cavity 54 and a second airbag 66 disposed in the second portion 60 of the cavity 54. The first airbag 64 and the second airbag 66 may be identical to each other or may be different than each other. The first airbag 64 and the second airbag 66 may extend from the first end 50 to the second end 52 of the beam 20. Alternatively, the first airbag 64 and/or the second airbag 66 may extend along only a portion of the distance from the first end 50 to the second end 52.

The first airbag 64 and the second airbag 66 may be formed of any suitable type of material, e.g., from a woven polymer. For example, the first airbag 64 and the second airbag 66 may be formed of woven nylon yarn, e.g., nylon 6, 6. Other suitable examples include polyether ether ketone (PEEK), polyetherketoneketone (PEKK), polyester, or any other suitable polymer. The woven polymer may include a coating, such as, for example, silicone, neoprene, urethane, etc. For example, the coating may be polyorgano siloxane.

The inflatable device 62 may include at least one inflator 68 (shown schematically in FIG. 9) in communication with the first airbag 64 and the second airbag 66 expand the airbags 64, 66 with inflation medium, such as a gas. The inflator 68 may be, for example, a pyrotechnic inflator 68 that uses a chemical reaction to drive inflation medium to the airbags 64, 66. The inflator 68 may be of any suitable type, for example, a cold-gas inflator 68. The inflator 68 may be mounted to any suitable portion of the vehicle 12 and may be in communication with the first airbag 64 and the second airbag 66 in any suitable fashion.

Figure 9:
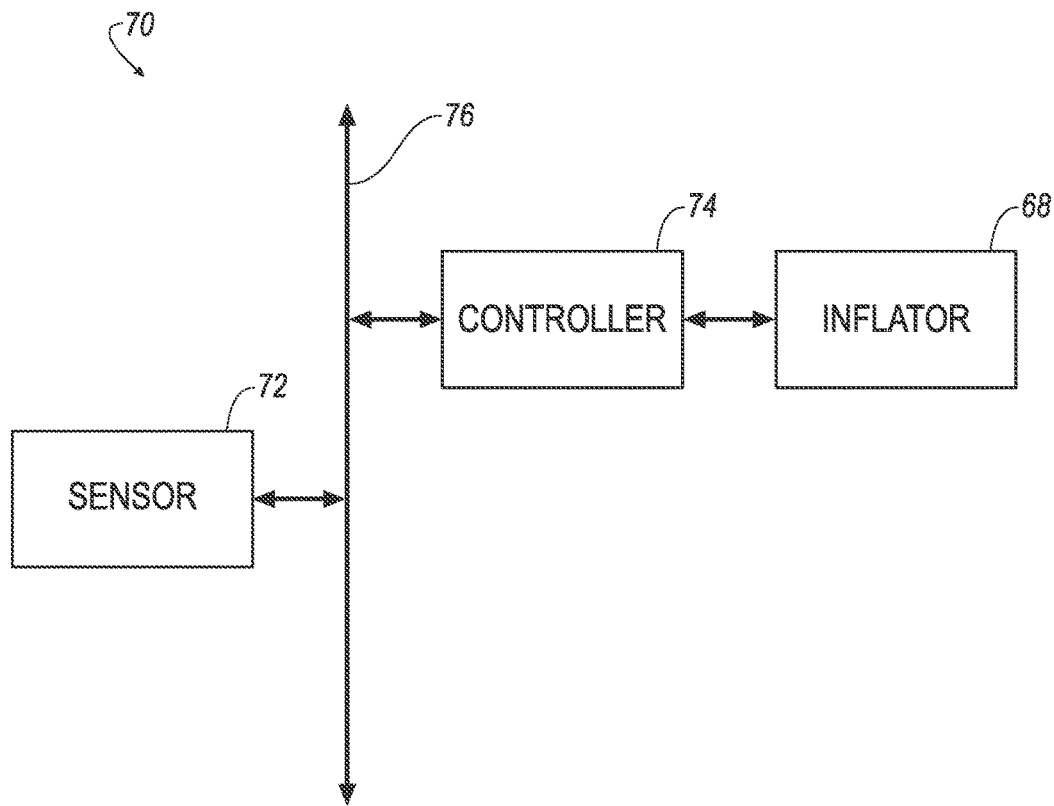
FIG. 9 is a schematic of an impact sensing system.

The vehicle 12 may include an impact sensing system 70, schematically shown in FIG. 9. The impact sensing system 70 is in communication with the deployment mechanism 32, e.g., the inflator 68 of the inflatable device 62. The impact sensing system 70 may include at least one sensor 72 for sensing impact of the vehicle 12, and a controller 74 in communication with the sensor 72 and the deployment mechanism 32. For example, the controller 74 may be in communication with the inflator 68 of the inflatable device 62 for activating the inflator 68, e.g., for providing an impulse to a pyrotechnic charge of the inflator 68 when the sensor 72 senses an impact of the vehicle 12. Alternatively or additionally to sensing impact, the impact sensing system 70 may be configured to sense impact prior to impact, i.e., pre-impact sensing. The sensor 72 may be of any suitable type, e.g., using radar, lidar, and/or a vision system. The vision system may include one or more cameras, CCD image sensors, and/or CMOS image sensor, etc.

The controller 74 may be a microprocessor-based controller. The sensor 72 is in communication with the controller 74 to communicate data to the controller 74. Based on the data communicated by the sensor 72, the controller 74 instructs the inflator 68 to activate.

The controller 74 and the sensor 72 may be connected to a communication bus 76, such as a controller area network (CAN) bus, of the vehicle 12. The controller 74 may use information from the communication bus 76 to control the activation of the inflator 68. The inflator 68 may be connected to the controller 74, as shown in FIG. 9, or may be connected directly to the communication bus 76.

With reference to FIGS. 6-8, the walls are rotatable about the hinges 30 from a collapsed position to an expanded position. The hinges 30 allow the walls to rotate relative to each other to allow the beam 20 to open from the collapsed position to the expanded position when deployment mechanism 32 is activated. The beam 20 of FIGS. 6-8 includes four hinges 30 at the intersections of the top wall 22, side walls 26, 28, and bottom wall 24, respectively. The beam 20 of FIGS. 6-8 also includes hinges 30 between the dividing wall 56 and the top wall 22 and between the dividing wall 56 and the bottom wall 24. The hinges 30 may be spring loaded (not shown) to bias the beam 20 toward the collapsed position during normal operation.

Each hinge 30, for example, may include a hollow member 78 connected to one of the walls 22, 24, 26, 28 and an inner member 80 connected to another of the walls 22, 24, 26, 28. Specifically, each wall 22, 24, 26, 28 includes one hollow member 78, which receives an inner member 80 of an adjacent wall 22, 24, 26, 28 to define one hinge 30, and one inner member 80, which is received in an hollow member 78 of an adjacent wall to define another hinge 30. The inner member 80 of each hinge 30 is rotatably disposed within the hollow member 78 of that hinge 30. The hollow member 78 and the inner member 80 may be cylindrical, as shown in FIGS. 6-8 and the hollow member 78 may extend annularly about the inner member 80. In the alternative to the hollow member 78 and the inner member 80, the hinge 30 may be of any suitable configuration.

The hollow member 78 defines a slot 82 through which the wall 22, 24, 26, 28 connected to the inner member 80 extends, as best shown in FIG. 7. The slot 82 of each hollow member 78 may extend from the first end 50 to the second end 52 of the beam 20.

With continued reference to FIGS. 6-8, the hinges 30 may be configured to stop in the expanded position. For example, the hollow member 78 may include an inward protrusion 84 and the inner member 80 may include an outward protrusion 86 configured to contact the inward protrusion 84 in the expanded position. Specifically, the hollow member 78 may include four inward protrusions 84 spaced from each other by approximately 90°. The inner member 80 includes two outward protrusions 86 spaced from each other by approximately 180° with the wall 22, 24, 26, 28 connected to the inner member 80 disposed approximately 90° from each of the outward protrusions 86. The slot 82 may extend between two inward protrusions 84.

With reference to FIGS. 6 and 7, when the beam 20 is in the collapsed position, the outward protrusions 86 contact the inward protrusions 84 and the wall 22, 24, 26, 28 connected to the inner member 80 contacts the inward protrusion 84 at the slot 82. When the beam 20 moves to the expanded position, as shown in FIG. 8, the hollow member 78 and the inner member 80 rotate approximately 90°, e.g., clock-wise as shown in FIGS. 6-8, relative to each other until the outward protrusions 86 and inward protrusions 84 contact each other in the position shown in FIG. 8. The contact between the inward protrusions 84 and the outward protrusions 86 prevents further rotation of the hinges 30 and walls to stop rotation the hinges 30 and walls in the expanded position. In other words, the inward protrusions 84 and the outward protrusions 86 act as stops to stop movement of the beam 20 in the expanded position.

With reference to FIG. 8, for each hinge 30, the wall 22, 24, 26, 28 connected to the inner member 80 may abut the outer member in the slot 82 in the expanded position to prevent further rotation of the hinges 30 and walls 22, 24, 26, 28 to stop the beam 20 in the expanded position. In the Figures, this abutment of the inner member 80 in the slot 82 operates in conjunction with the abutment of the inward protrusions 84 and outward protrusions 86. However, it should be appreciated that the abutment of this wall 22, 24, 26, 28 with the outer member in the slot 82 may be used in addition to, or in the alternative to, the inward protrusions 84 and outward protrusions 86. In other words, the wall 22, 24, 26, 28 may be designed without the inward protrusions 84 and the outward protrusions 86 such that rotation of the walls 22, 24, 26, 28 and hinges 30 is stopped in the expanded position only by contact between the wall connected to the inner member 80 with the outer member in the slot 82.

In operation, the beam 20 is maintained in the collapsed position as the vehicle 12 is operated under normal conditions. As such, under normal conditions, the device 10 has a small profile, i.e., consumes little space.

In the event that the impact sensing system 70 detects a vehicle impact, e.g., a side impact, the controller 74 instructs the deployment mechanism 32 to move the device 10 from the collapsed position to the expanded position, e.g. instructs the inflator 68 to inflate the first airbag 64 and the second airbag 66 to the inflated position, as shown in FIG. 5B. As the first airbag 64 and the second airbag 66 inflate in the cavity 54, the airbags force the bottom wall 24 downwardly away from the top wall 22. During the downward movement of the bottom wall 24, the side walls 26, 28 and the dividing wall 56 rotate relative to the top wall 22 and the bottom wall 24 at the hinges 30. The top wall 22 may remain stationary relative to the rails as the bottom wall 24 moves downwardly away from the top wall 22. When the beam 20 reaches the expanded position, the inward protrusions 84 and outward protrusions 86 contact each other to prevent further relative rotation of the walls to stop the beam 20 in the expanded position. In the expanded position, the beam 20 reinforces the rails 16, 18, i.e., transfers force from the impacted rail 16, 18 to the other rail 16, 18, to resist deformation of the rail 16, 18.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle chassis comprising:
   a pair of rails spaced from each other;
   a beam disposed between the pair of rails and including walls and hinges connected in alternating arrangement;
   each hinge being connected to two of the walls, the walls being rotatable about the hinges from a collapsed position to an expanded position;
   an inflatable device disposed between the walls;
   a battery disposed above the beam.

2. The vehicle chassis as set forth in claim 1 wherein the beam is connected to the pair of rails.

3. The vehicle chassis as set forth in claim 1 wherein each hinge includes a hollow member connected to one of the walls and an inner member connected to another of the walls and rotatably disposed within the hollow member.

4. The vehicle chassis as set forth in claim 3 wherein the hollow member includes an inward protrusion and the inner member includes an outward protrusion configured to contact the inward protrusion.

5. The vehicle chassis as set forth in claim 1, wherein the beam is elongated along an axis and includes an internal cavity elongated along the axis, and wherein the walls and hinges surround the axis.

6. A vehicle comprising:
a pair of rails spaced from each other;
a beam disposed between the pair of rails and including walls and hinges connected in alternating arrangement;
each hinge being connected to two of the walls, the walls being rotatable about the hinges from a collapsed position to an expanded position;
an inflatable device disposed between the walls;
an impact sensing system in communication with the inflatable device; and
a battery disposed above the beam.

7. The vehicle as set forth in claim 6 wherein the impact sensing system includes an impact sensor and a controller in communication with the impact sensor and the inflatable device.

8. The vehicle as set forth in claim 6 wherein the beam is connected to the pair of rails.

9. The vehicle as set forth in claim 6 wherein each hinge includes a hollow member connected to one of the walls and an inner member connected to another of the walls and rotatably disposed within the hollow member.

10. The vehicle as set forth in claim 9 wherein the hollow member includes an inward protrusion and the inner member includes an outward protrusion configured to contact the inward protrusion.

11. A deployable reinforcing device comprising:
a beam extending from a first end to a second end, the beam including walls and hinges defining a cavity between the walls and hinges, the cavity extending from the first end to the second end;
each hinge being connected to two of the walls, the walls being rotatable about the hinges from a collapsed position to an expanded position; and
an inflatable device disposed in the cavity;
wherein each hinge includes a hollow member connected to one of the walls and an inner member connected to another of the walls and rotatably disposed within the hollow member; and
wherein the hollow member includes an inward protrusion and the inner member includes an outward protrusion configured to contact the inward protrusion.

* * * * *